(12) United States Patent
Herb (10) Patent No.: US 7,217,058 B2
(45) Date of Patent: May 15, 2007

(54) CONNECTION DEVICE FOR CONNECTING MOUNTING RAILS

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/054,161

(22) Filed: Feb. 9, 2005

(65) Prior Publication Data

US 2005/0226683 A1   Oct. 13, 2005

(30) Foreign Application Priority Data

Feb. 9, 2004   (DE) .................. 10 2004 006211

(51) Int. Cl.
*F16B 9/00* (2006.01)

(52) U.S. Cl. ..................... 403/237; 403/230

(58) Field of Classification Search ............ 403/169, 403/178, 387, 231, 232.1, 187, 192; 256/65.04, 256/65.06, 65.12, 65.03, 65.05, 65.08; 211/191–192; 248/58, 220.41, 222.51, 223.31
See application file for complete search history.

(56) References Cited

U.S. PATENT DOCUMENTS

| 1,720,104 | A | * | 9/1929 | Taylor et al. ............ 403/232.1 |
| 2,080,261 | A | * | 5/1937 | Funk ...................... 248/231.31 |
| 3,036,347 | A | * | 5/1962 | Findleton ................. 403/217 |
| 3,397,499 | A | * | 8/1968 | Ward ......................... 52/777 |
| 3,858,988 | A | * | 1/1975 | Cohen ........................ 403/18 |
| 3,901,611 | A | * | 8/1975 | Simonsen ................. 403/187 |
| 4,189,123 | A | * | 2/1980 | Johnson ................. 248/222.51 |
| 4,231,204 | A | | 11/1980 | Krueger et al. |
| 4,396,311 | A | * | 8/1983 | Gerdman ................. 403/187 |
| 4,789,286 | A | * | 12/1988 | Laput ........................ 411/84 |
| 5,349,800 | A | * | 9/1994 | Peng ...................... 52/506.06 |
| 6,196,401 | B1 | * | 3/2001 | Brady et al. .............. 211/186 |
| 6,520,357 | B1 | * | 2/2003 | Kautz et al. .............. 211/191 |
| 6,719,481 | B2 | | 4/2004 | Hoffmann |
| 6,877,291 | B2 | * | 4/2005 | Shamroukh et al. ......... 52/702 |
| 2001/0004099 | A1 | * | 6/2001 | Onishi ....................... 248/49 |
| 2002/0029529 | A1 | * | 3/2002 | Waalkes et al. ............. 52/36.1 |
| 2002/0054788 | A1 | * | 5/2002 | Hoffmann |
| 2005/0019096 | A1 | | 1/2005 | Prange |

FOREIGN PATENT DOCUMENTS

| DE | 2323032 | 11/1974 |
| DE | 9816858 | 3/2000 |

OTHER PUBLICATIONS

European Search Report.

* cited by examiner

*Primary Examiner*—Daniel P. Stodola
*Assistant Examiner*—Joshua T. Kennedy
(74) *Attorney, Agent, or Firm*—Abelman, Frayne & Schwab

(57) ABSTRACT

A connection device for connecting mounting rails (2,3,4) in a double-T joint includes an intermediate member (11) having two, extending substantially parallel to each other, legs (12) and a connection section (13), connecting the two legs (12), and at least one receiving member (26) connectable with the intermediate member (11) and having two, extending substantially parallel to each other legs (27), a connection section (28) for connecting the two legs (27), and a setting-in element for engaging in at least one of plurality of spaced from each other and located opposite each other, elementary receptacles (18) provided in at least one leg (12) of the intermediate member (11).

15 Claims, 6 Drawing Sheets

CONNECTION DEVICE FOR CONNECTING MOUNTING RAILS

BACKGROUND OF THE INVENTION

1. Field of the Invention

The present invention relates to a connection device for connecting mounting rails in a double-T joint and includes an intermediate member and at least one receiving member connectable with the intermediate member. The intermediate member has two, extending substantially parallel to each other, legs and a connection section connecting the two legs for at least partially encompassing a first one of the mounting rails.

The at least one receiving member has two extending substantially parallel to each other legs and a connection section for connecting the two legs. In the at least one receiving member, a second one of the mounting rails, which butt-joins the first one of the mounting rails, is received. The at least one of the legs of the intermediate member has a plurality of, spaced from each other and located opposite each other, elementary receptacles for receiving the at least one receiving member.

2. Description of the Prior Art

Mounting rails are well known and are used, e.g., for connecting connection parts or conduit strings. Because of a large number of possible uses of the mounting rails, they are connected in a support framework by using attachment parts or connection devices.

E.g., in steel-clad or reinforced concrete halls, for providing flexible connection possibilities in constructional technology and for feeding of process media such as, e.g., current, compressed air, water, there are formed intermediate planes in form of grid ceilings formed by mounting rails and which are suspended from roof supports of a hall. The grid ceilings, which are formed of mounting rails, can be easily adapted to variable loads, e.g., for arranging of heavy conduits, or to particular static requirements by selection of corresponding mounting rails.

Usually, the grid ceilings include main girders extending in one direction and between which, sections of mounting rails as cross-girders in double-T joints are arranged, e.g., as supports or for stiffening of the grid ceilings. Grid ceilings and other frameworks, which are formed of mounting rails, provide a plurality of possibilities for securing, e.g., tubular conduits on the mounting rails with known connection parts such as angles and/or pipe clamps.

German Publication DE 100 00 092-A1 discloses a connection device for connecting mounting rails in a double-T joint and including a U-shaped intermediate member for encompassing a first mounting rail and at least one U-shaped receiving member fixedly securable to a leg of the intermediate member and in which a second mounting rail, which butt-joins the first mounting rail, is received. The connection device further includes a stirrup that serves as a securing element for the attachable mounting rail, is secured in undercuts provided on the free edges of the leg and secures the second mounting rail to the connection device with a rail nut that serves as attachment means.

The drawback of the connection device of DE 100 00 092-A1 consists in that only mounting rails, which have a certain height, can be connected with the first rail for forming a double-T joint. For different mounting rails having different heights, a plurality of differently formed connection devices are required which are expensive to manufacture and which require large logistic expenses from the manufacturer, dealer and user. When the known device is used, e.g., for forming a suspended grid ceiling, mounting rails with different heights, upon being connected, do not provide a continuous lower or bearing surface of the grid ceiling, e.g., for mounting of conduits in a substantially linear plane or for the arrangement of plaster plates, sheathing plates, or acoustic panels.

European Publication EP 1 201 936 A1 discloses a connection device for connecting mounting rails in a double-T joint and including one or more U-shaped intermediate members for encompassing a first mounting rail, and at least one U-shaped receiving member releasably secured on a leg of an intermediate member with a locking device and in which a second mounting rail, which butt-joins the first mounting rail is received. With a further receiving member and with use of a rail nut, which form fastening means, the second mounting rail can be secured to the connection device. The locking device has four elementary receptacles arranged about an inner thread and which are provided on each leg of the intermediate member, and four spigots provided on the receiving member and engaging the elementary receptacles. The locking device provides for rotation of the receiving member by an angle, which is multiple of 90°, for proper arrangement of the receiving member on the leg of the intermediate member.

The drawback of the connection device of EP 1 201 936 A2 consists in that for connecting different mounting rails having different height dimensions, several intermediate members should be arranged on the first mounting rail which, e.g., is not possible with a substantially horizontal grid ceiling without additionally arranging of vertical sections of mounting rails on the grid ceiling. Furthermore, with the known connection device upon use of mounting rails having different heights, only grid ceilings with a bottom flat bearing surface, e.g., for arrangement of plaster or sheathing plates can be produced. Placing of conduits in a substantially straight plane on the produced grid ceiling, when mounting rails of different heights are used, is not possible with the connection device of EP 1 201 936 A2.

Accordingly, an object of the present invention is to provide a connection device with which connection of mounting rails, which have different heights, is possible and which, at the same time, will be very flexible in its use.

SUMMARY OF THE INVENTION

This and other objects of the present invention, which will become apparent hereinafter, are achieved by providing the at least one receiving member with setting-in element that is set in one of the elementary receptacles of the leg of the intermediate member.

In the connection device according to the present invention, the intermediate member has a substantially U-shaped profile with which is encompasses at least partially the first mounting rail to which further mounting rails need to be secured with the inventive connection device. For positioning of the intermediate member, it is displaced along the first mounting rail and is secured in the desired position with at least one fastening element. The connection section of the intermediate member has one or several through-openings in which the at least one fastening element for securing the intermediate member on the first mounting rail can be arranged or would be inserted beforehand.

The elementary receptacles, which are arranged on at least one leg of the intermediate member in a spaced relationship to each other and opposite each other, are arranged at different distances from the connection section of the intermediate member for receiving the at least one receiving member. The different distances are determined in accordance with heights of the mounting rails to be secured with the connection device.

The spaced from each other and arranged opposite each other, elementary receptacles are advantageously arranged parallel to the plane defined by the connection section of the intermediate member and are formed as openings with straight end edges. The elementary receptacles have, e.g., a rectangular cross-section or a circular cross-section.

The at least one receiving member has also a substantially U-shaped cross-section. The further mounting rails to-be-connected with the first mounting rail, are introduced from above downwardly into the at least one receiving member and are held in this position. The at least one receiving member is set in the elementary receptacles in the at least one leg of the intermediate member which are located closest to the height alignment of the mounting rail placed into the at least one receiving member.

In order to improve the flexibility of the inventive connection device, the spaced from each other and located opposite each other elementary receptacles are arranged on both legs of the intermediate member at different distances from the connection section of the intermediate member for receiving two receiving members. The elementary receptacles on both legs have advantageously the same profile. The receiving members can be set in both legs of the intermediate member at the same distance from the connection section or at different distances from the connection section. This arrangement of the inventive connection device permits to arrange two opposite mounting rails on the first mounting rail, e.g., to form a grid ceiling. In the receiving members, there can be introduced mounting rails having the same height or different heights.

Advantageously, at least one setting-in element is provided on each leg of the at least one receiving member, with the setting-in elements of the two legs of the at least one receiving member being arranged opposite each other and having a substantially hook-shaped profile for engaging the leg of the intermediate member from behind. The distance between opposite setting-in elements corresponds to the distance between opposite, spaced from each other, elementary receptacles for the at least one receiving member which are provided on the at least one leg of the intermediate member. A setting-in connection between the receiving member and the intermediate member is provided by setting the setting-in elements of the receiving member in the elementary receptacles of the leg of the intermediate member. The setting-in elements are advantageously provided in the region of the end of the leg of the receiving member remote from the connection section of the receiving member. Advantageously, the free end of the hook-shaped setting-in element faces away from the plane defined by the connection section of the receiving member. After the free end of the hook-shaped setting-in element is inserted in the elementary receptacle, the receiving member is brought into abutment with the leg of the intermediate member or with the side wall of the first mounting rail by a rotational movement about the setting-in element. The connected sections of the free ends of the setting-in elements with respect to the legs of the receiving member provide for the support of the receiving member on the intermediate member. The setting-in elements engage the side edges of the elementary receptacles from behind at least regionwise.

Advantageously, the setting-in elements are arranged on the edges of the legs of the receiving member and in planes formed by the legs. This arrangement of the setting-in elements provides for a simple and cost-effective manufacturing of the receiving member by a stamping and bending process. Further, with this construction of the receiving member, no material sections are formed which would reduce at least partially the receiving space formed by planes of the legs of the receiving member. This noticeably facilitates the assembly of the connection device and the connection of the further mounting rails with the first mounting rail.

Advantageously, a plurality of engagement elements are provided on the legs of the at least one receiving member for providing a locking connection between the at least one receiving member and the intermediate member. Preferably, the engagement elements are formed as pin-shaped elements and are provided on the edges of the legs of the at least one receiving member. The engagement elements are so arranged relative to each other and relative to the setting-in elements on the legs of the receiving member and are arranged opposite each other in such a way that they can be inserted in the elementary receptacles, which are provided for the setting-in elements on the at least one leg of the intermediate member, for forming a locking connection. When, e.g., the receiving member is mounted in lower elementary receptacles of the intermediate member, the engagement elements can be located outside of the free end of the leg of the intermediate member remote from the connection section of the intermediate member. The pin-shaped elements can be formed as cylindrical or square pin elements. In addition, the engagement elements can be formed, in a direction from their free ends, as trapezoidal or conical elements, which facilitate, in particularly upon setting the receiving member in the intermediate member, penetration of the engagement elements in the elementary receptacles of the legs of the intermediate member.

Advantageously, the connection device includes a securing element, which is fixed on the intermediate member and which provides for tightening of the second mounting rail with the connection device by fastening means. On at least one of the legs of the intermediate member, there are provided a plurality of spaced from each other, securing receptacles for the securing elements which secure mounting rails having different heights and receivable in the at least one receiving member. The securing element has a substantially rectangular cross-section and an opening with straight edges. Because of the setting-in connection between the intermediate member and the securing element, this setting-in connection is secured in a direction transverse to the plane formed by the leg of the intermediate member. The securing element, which is set in a securing receptacle in the leg of the intermediate member and is provided on a free side which the set-in securing element abuts and which is located closest to the mounting rail received in the receiving member, tightens the set mounting rail with the connection device with the use of appropriate fastening means.

In addition to placing a mounting rail from above into the receiving member, an attachable mounting rail can be placed from the side or from below into the receiving member, which is correspondingly secured to a leg of the intermediate member, an be tightened with the connection device by the securing element.

The fastening means, which is used with the securing element, includes, e.g., a screw and a nut which is formed as an engaging from behind, part for engaging from behind free ends of the mounting rail, i.e., as a so-called rail nut. The fastening means is inserted through a through-opening provided in the securing element for securing the second mounting rail with the connection device. Alternatively, the fastening means can be mounted on the securing element beforehand.

Advantageously, the securing element has a setting-in section that provides for setting-in connection between the securing element and the intermediate member, and a bearing section for placing the securing element on the to-be-connected mounting rail. Optionally, the setting-in section can be formed as a hook-shaped section and is arranged, preferably, remotely from the side of the bearing section which a setting-in section for the fastening means abuts. The setting-in section is introduced into in a securing receptacle which is formed in the leg of the intermediate member and which is located closest to the to-be-secured mounting rail. The bearing section of the securing element is brought in an abutting contact with the mounting rail, which is received in a receiving member, by being pivoted in a direction of the mounting rail. The mounting rail becomes releasably connected with the connection device upon actuating the fastening means.

Advantageously, the setting-in section has a smaller width than the bearing section. The width of the setting-in section corresponds maximum to the distance between the legs of the receiving member. For reducing the consumption of material during manufacturing of the securing element, preferably, the width of the setting-in section corresponds to the width of the securing receptacles in the leg of the intermediate member. The width of the bearing section corresponds substantially to the total width of the mounting rail.

Advantageously, the setting-in section extends to a plane, which is defined by the bearing section, at an angle α from 0° to 25°, preferably, at an angle α from 5° to 15°. However, the setting-in section of the securing element can lie, viewing from the free end of the hook-shaped section when the setting-in section has a hook shape, in the same plane as the bearing section. The through-opening for the fastening means, which secures the mounting rail to the connection device is formed, preferably, in the bearing section. With the angular arrangement of the setting-in section relative to the bearing section, an additional tightening force acts on the connection between the mounting rail and the connection device upon tightening of the fastening means. Thereby, the reliability of the connection is increased. The securing element permits to compensate the manufacturing tolerances of the connection device and also the tolerances of the connection between the connection device and the mounting rail.

Advantageously, the intermediate member has, in its connection section, a receptacle for a tightening element and having, preferably, a threaded section. When the inventive connection device is used for forming of an intermediate plane suspendable from a support construction of a building, the receptacle serves for arrangement of one of the tightening elements of the suspension. The threaded section of the receptacle corresponds to the connection region of the tightening element. When, e.g., the connection region has a threaded section with an outer thread, the threaded section of the receptacle has an inner thread that cooperates with the outer thread of the connection region. When the connection region has a threaded section with an inner thread, the receptacle has a threaded region with an outer thread that cooperates with the inner thread of the connection region. According to one of the embodiment, the receptacle includes friction means into which the connection region of the tightening means is inserted.

Advantageously, there are provided, on the legs of the intermediate member, adjacent to each other, spacing sections for creating a free space for the setting-in element of the receiving member connectable with the intermediate member. The size of the spacing sections is so selected that the produced free space between the inner side surfaces of the legs of the intermediate member and the outer side of the first mounting rail provides for a trouble-free setting of the setting-in element of the receiving member and/or the setting-in section of the securing means.

The inventive connection device and its parts advantageously are formed preferably of metal by a stamping and bending process. When the inventive connection device is to be used, e.g., in a chemically aggressive environment, separate parts are advantageously formed of a corrosion-resistant material. Alternatively, separate parts of the entire connection device can be formed of a suitable plastic material.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
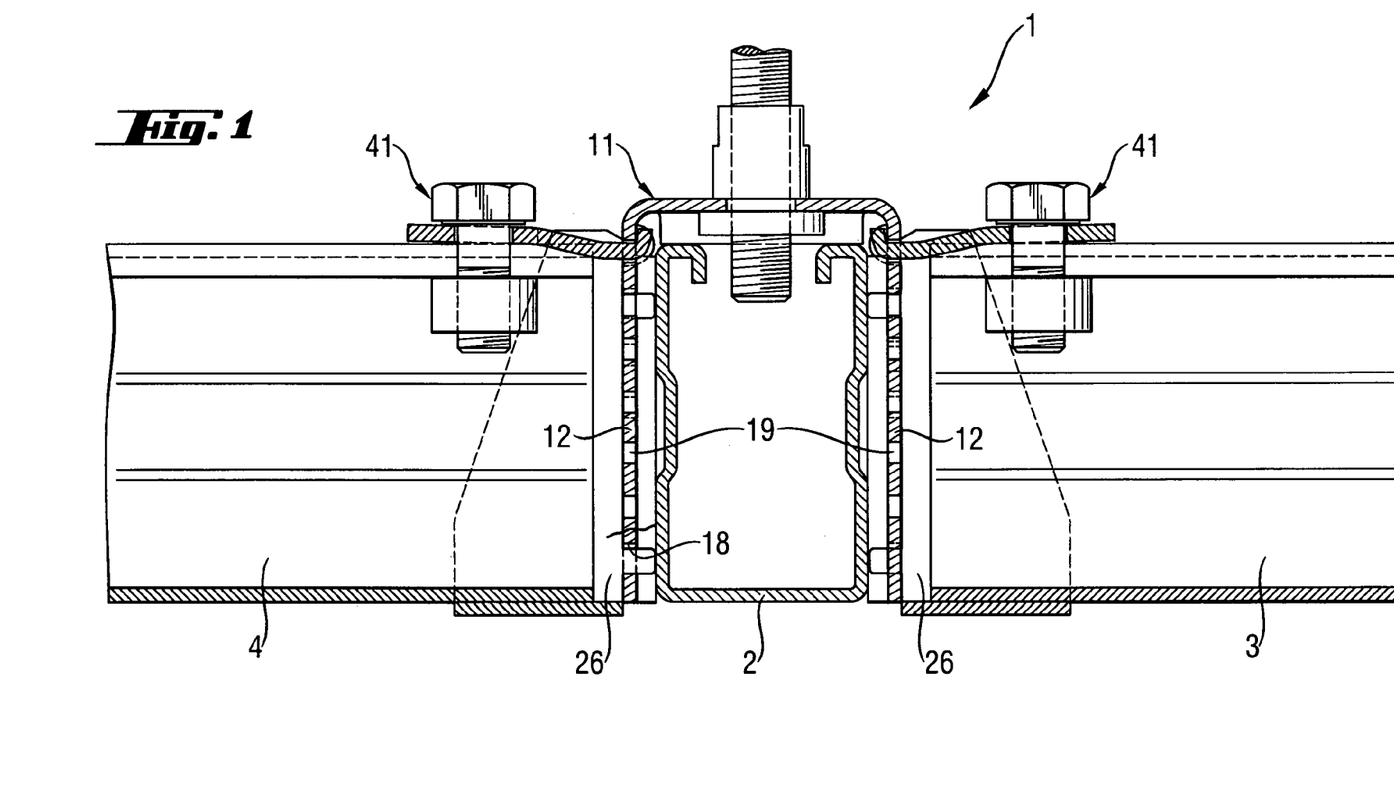
FIG. 1 a cross-sectional view of a connection device according to the present invention illustrating its use.

A connection device 1 for connecting two mounting rails 3 and 4 with mounting rail 2, which is shown in FIG. 1, includes an intermediate member 11, two receiving members 26, and securing elements 41 engageable in the intermediate member 11. All of the to-be-connected mounting rails 2, 3 and 4 have the same height.

Figure 2:
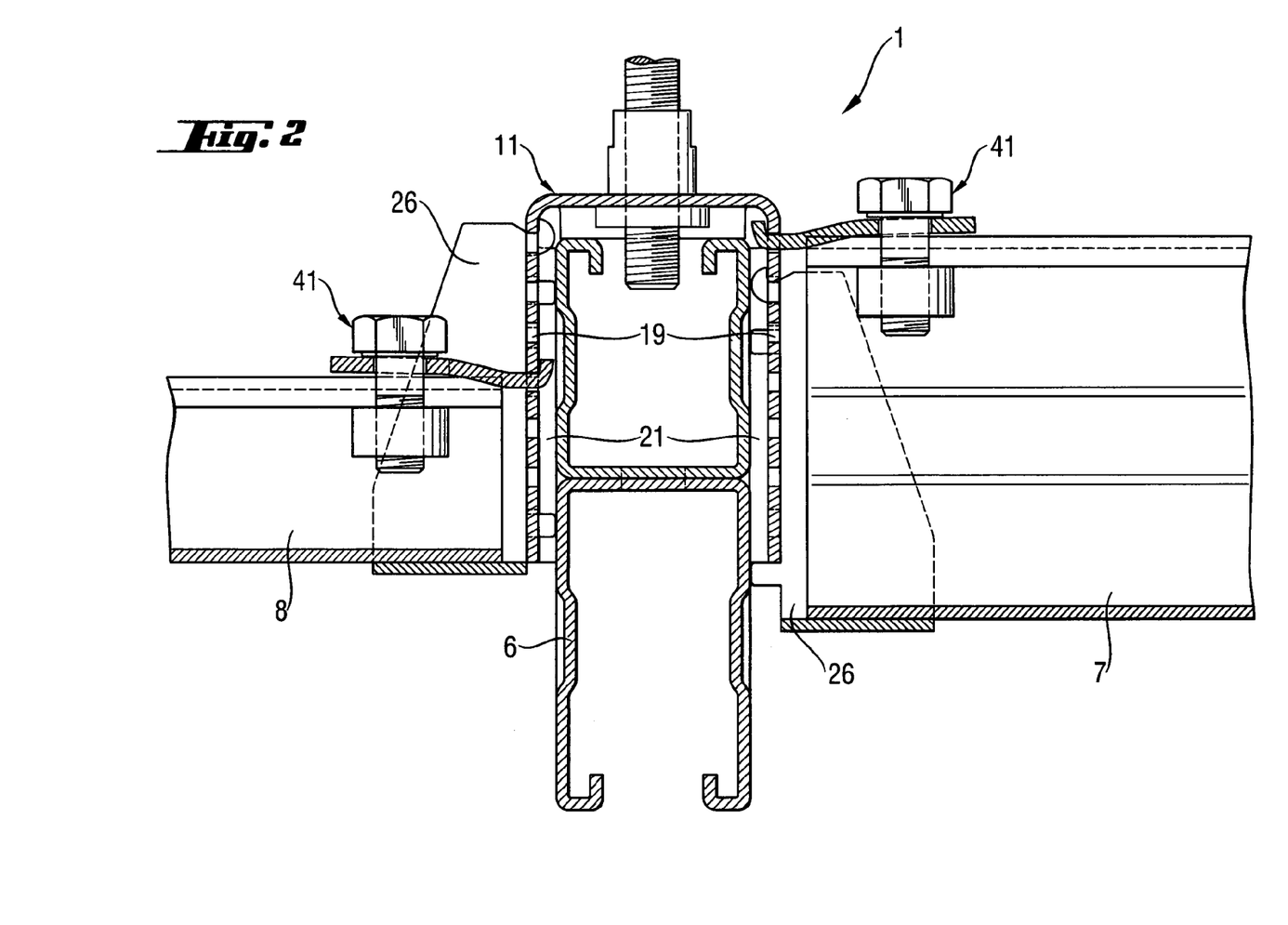
FIG. 2 a cross-sectional view of another embodiment of the connection device according to the present invention.

A connection device 1 for connecting two mounting rails 7 and 8 with a mounting rail 6, which is shown in FIG. 2, likewise includes an intermediate member 11, two receiving members 26, and two securing elements 41 engageable in the intermediate member 11. In the arrangement shown in FIG. 2, the to-be-connected mounting rails 6, 7 and 8 have different heights. The receiving members 26 engage in receptacles 18 spaced by different distance with respect to the connection section of the intermediate member 11.

Figure 3:
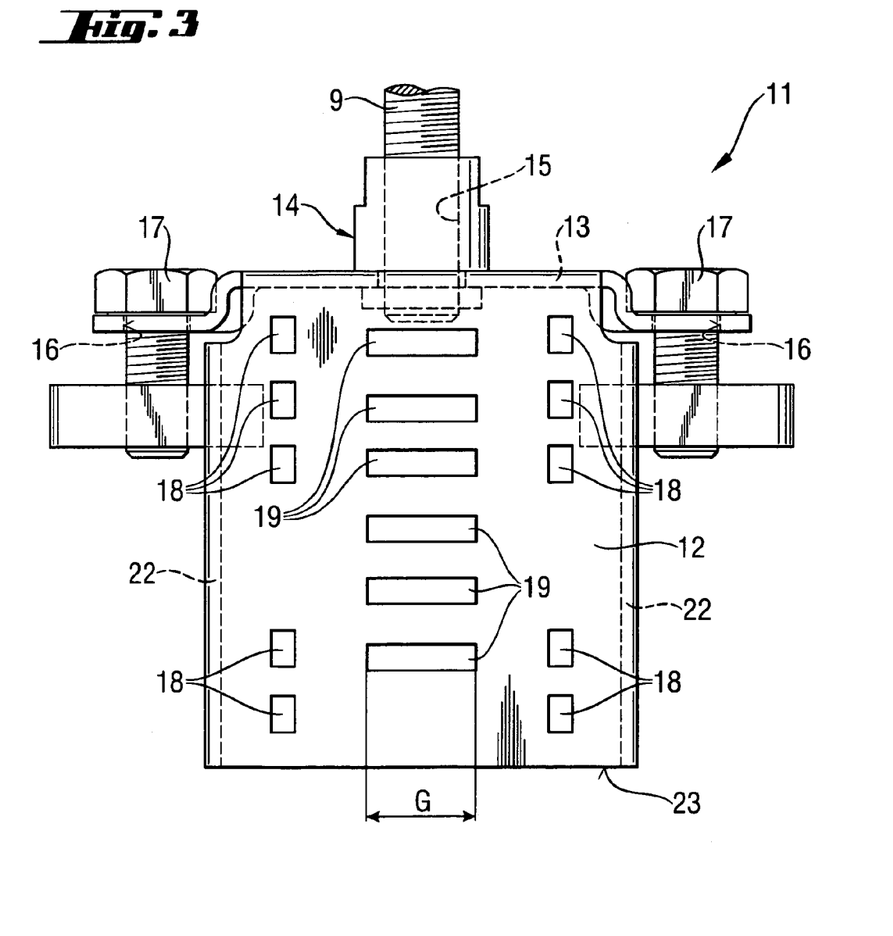
FIG. 3 a side view of a leg of the intermediate member of the inventive connection device.
Figure 4:
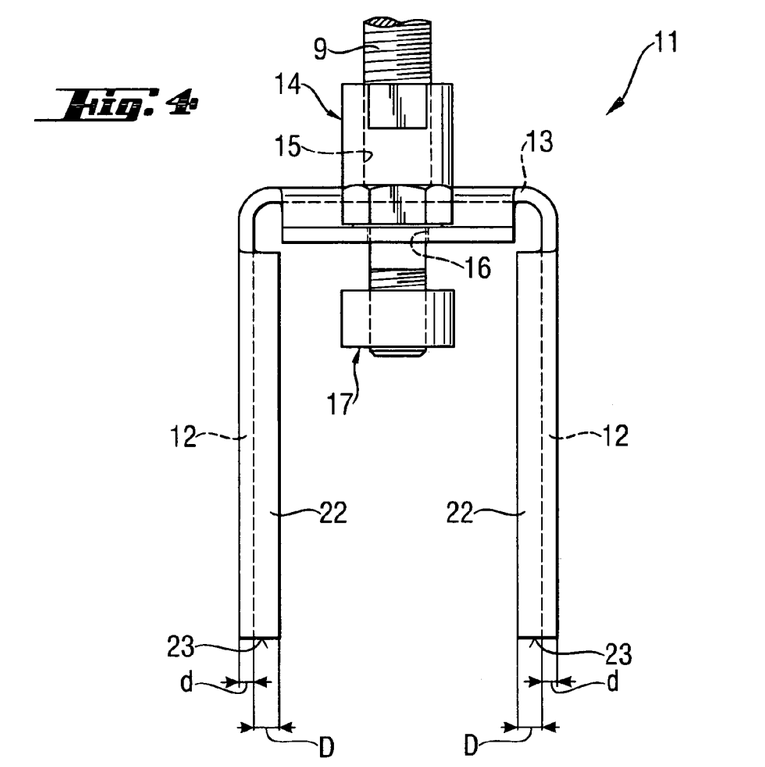
FIG. 4 another side view of the leg shown in FIG. 3.

The intermediate member 11, which is shown separately in FIGS. 3–4, has a U-shaped cross-section and two, arranged substantially parallel to each other, legs 12 and a connection 13 which connects the two legs 12. On the connection section 13, there is provided a receptacle 14 for a tightening element 9. The receptacle 14 has a threaded section 15 with an inner thread for attaching the connection device 1 to the tightening element 9 which has a connection region with an outer thread engageable in the inner thread of the receptacle 14. The connection section 13 of the intermediate member has two through-openings 16 for passing through of two fastening elements 17, e.g., of the rail nuts or screws that cooperate with a counter-nut securable in the mounting rail 2 or 6.

Both legs 12 of the intermediate member 11 have a plurality of respective, spaced from each other and arranged opposite each other, elementary receptacles 18. The elementary receptacles are aligned, pairwise, parallel to a plane that is formed by the connection section 13 of the intermediate member 11, for receiving the receiving members 26. The elementary receptacles 18 have a rectangular cross-section and are formed as openings with straight end edges. The distance of the elementary receptacle 18 from each other and from the connection section 13 of the intermediate member 11 in a direction of the longitudinal extent of the legs 12 varies and depends on the type of the mounting rails 3, 4 or 7, 8 which are to be received in the receiving members 26. A receiving member 26 engages in a corresponding elementary receptacle 18 in accordance with a desired alignment of the mounting rails 3, 4 or 7, 8 which are received in the respective receiving members 26.

The two legs 12 of the intermediate member 11 further have a plurality of spaced from each other, slot-shaped securing receptacles 19 that extend parallel to the plane, which is formed by the connection section 13 of the intermediate member 11, for receiving the securing elements 41. The securing receptacles 19 have a rectangular cross-section and are formed as openings with straight end edges. The securing element 41 engages in a respective securing receptacle 19 dependent on the height of the mounting rail 3, 4 or 7, 8 receivable in the receiving member 26.

In order to provide a free space 21 between the legs 12 of the intermediate member 11 and side walls of the mounting rail 2 or 6 for insuring insertion of the setting-in element of the receiving members 26 and for insuring engagement of the setting-in section 42 of the securing element 41, there are formed on the legs 12 of the intermediate member 11, spacing sections 22 which are aligned with the legs 12 and have an extent D.

Figure 5:
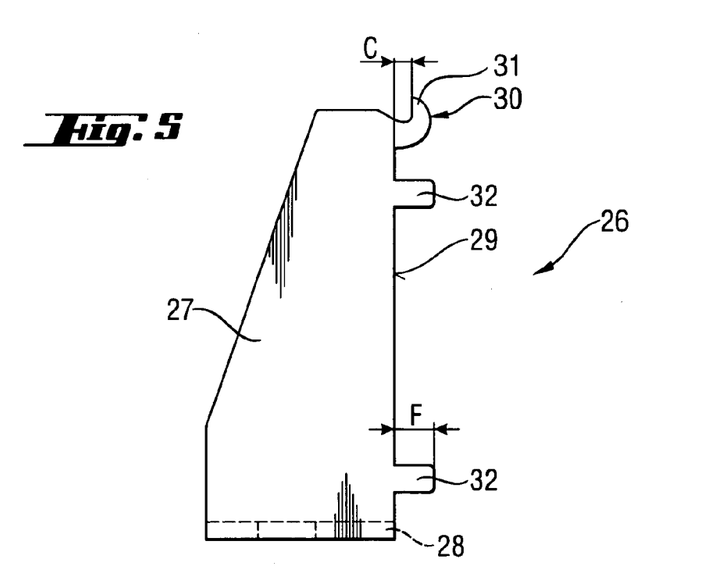
FIG. 5 a side view of the receiving member of the inventive connection device.

The receiving member 26 has a U-shaped cross-section with two, extending substantially parallel to each other, legs 27 and a connection section 28 that connects the two legs 27. On the edges 29 of the two legs 27, there are formed located opposite each other, setting-in elements 30 which provide for engagement of the receiving member 26 in two elementary receptacles 18. The setting-in element 30 is provided in an end region of the leg 27 remote from the connection section 28 of the receiving member 26. The setting-in elements 30 lie, respectively, in planes, which are formed by legs 27, and have a hook-shaped profile. The free end 31 of the setting-in element 30 extends away from the plane which is formed by the connection section 28 of the receiving member 26. In order to insure an easy mounting of the receiving member 26 on the leg 12 of the intermediate member 11, the distance C of the free end 31 of the setting-in element 30 from the edge 29 of the leg 27 amounts to somewhat more than the wall thickness d of the leg 12 of the intermediate member 11.

On the edge 29 of both legs 27, there are further provided, respectively, two pin-shaped engagement elements 32 for engagement in the elementary receptacles 18 or for mounting of the receiving member 26 on a side wall of the mounting rail 2 or 6. The pin-shaped setting-in element 32 lies in a plane formed by a respective leg 27. The extent F of the setting-in element 32 from the edge 29 in the plane, which is formed by leg 27, somewhat corresponds to the sum of the wall thickness d of the leg 12 of the intermediate member 11 and the extent D of the spacing section 22 from the inner side of the leg 12 of the intermediate member 11. The distance of the setting-in element 32 from each other is so selected that upon arrangement of the receiving member 26 in an upper elementary receptacle 18 of the leg 12 of the intermediate member 11 adjacent to the connection section 13 of the intermediate member 11, the engagement element 32 engages in the elementary receptacle 18 remote from the connection section 13 of the intermediate member 11 or lies outside of the free edge 23 of the leg 12 of the intermediate member 11.

Figure 6:
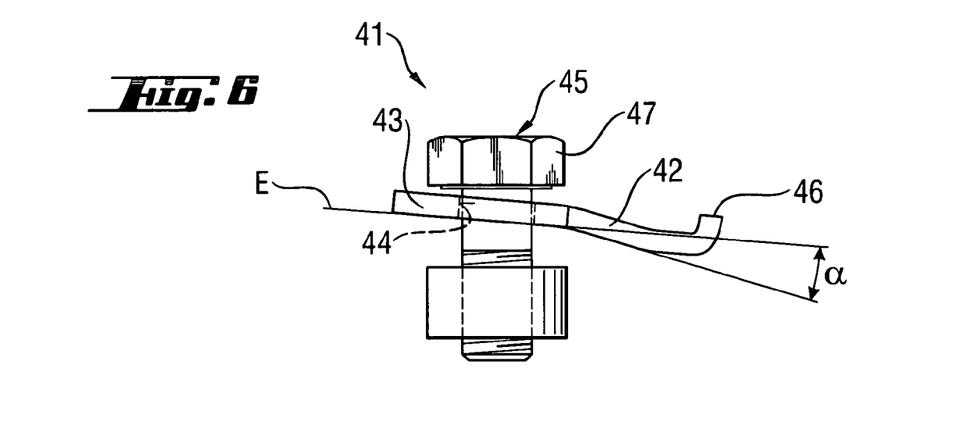
FIG. 6 a side view of the securing element of the inventive connection device.
Figure 7:
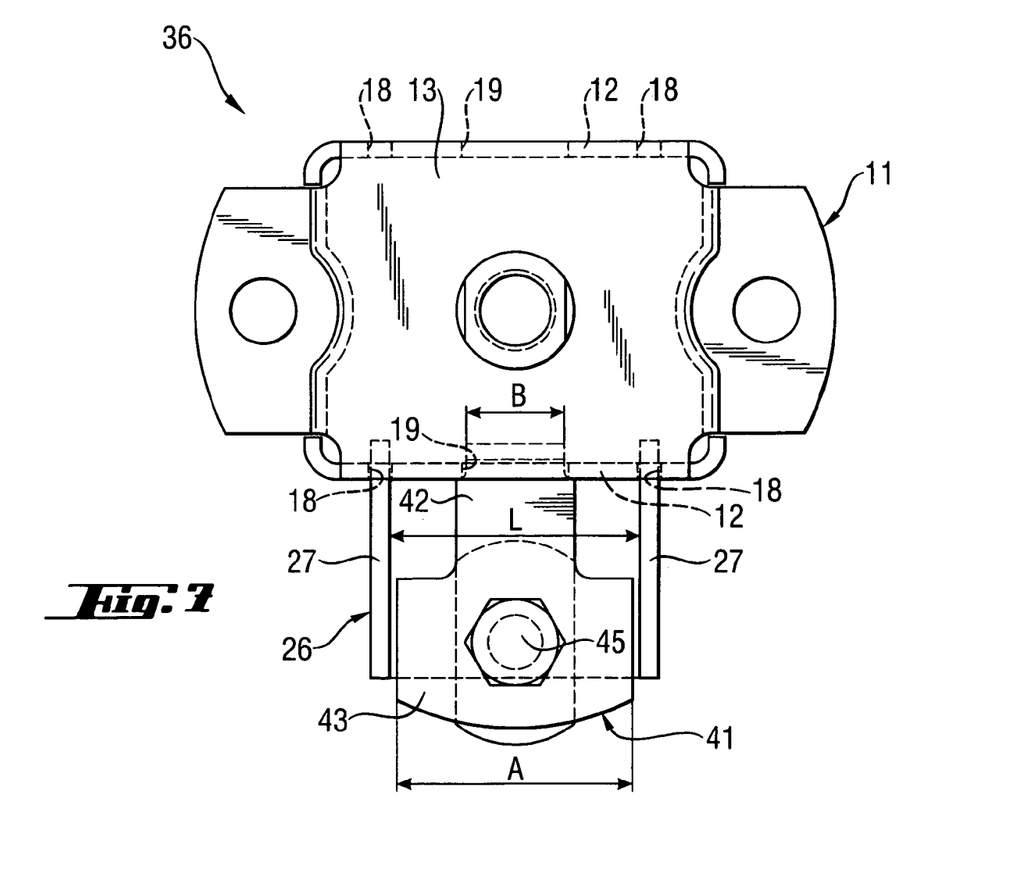
FIG. 7, a basic view of a yet another connection device according to the present invention.

The securing element 41, which is shown in FIG. 6, has a setting-in section 42 and a bearing section 43. A through-opening 44 for a fastening element 45, here a bolt, is formed in the bearing section 43. With the fastening elements 45 which extends through the through-openings 44 in the securing elements 41, the mounting rails 3, 4 or 7, 8, which are received in the receiving members 26, are secured to the connection device 1.

The setting-in section 42 has a smaller width B than the width A of the bearing section 43. The width B of the setting-in section 42 is also smaller than the width G of the receiving receptacle 19 of the leg 12 of the intermediate member 11. The width A of the bearing section 43 corresponds maximum to the distance L between the legs 27 of the receiving member 26 and somewhat to the width of the mounting rail 3, 4 or 7, 8 that is secured with the securing element 41. The setting-in section 42 of the securing element 41 has a free end 46 having a hook-shaped profile in the longitudinal direction of the securing element 41 and extends at an angle to plane E defined by the bearing section 43 of the securing element 41. The angle α, which the setting-in section 42 forms with the plane E, amounts to about 12°.

Figure 8A:
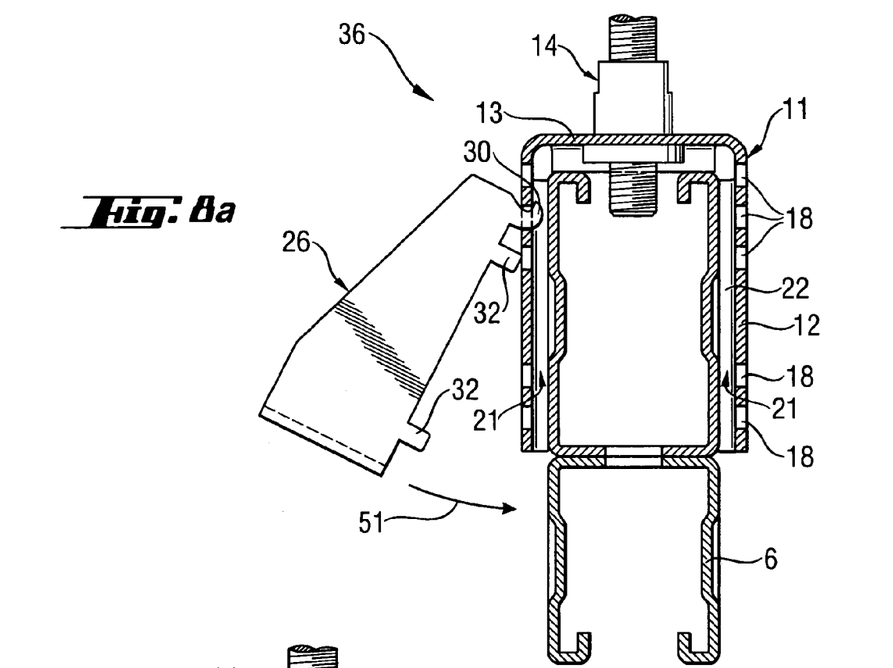
FIG. 8a a cross-sectional view illustrating a first stage of setting of the receiving member in the intermediate member.
Figure 8B:
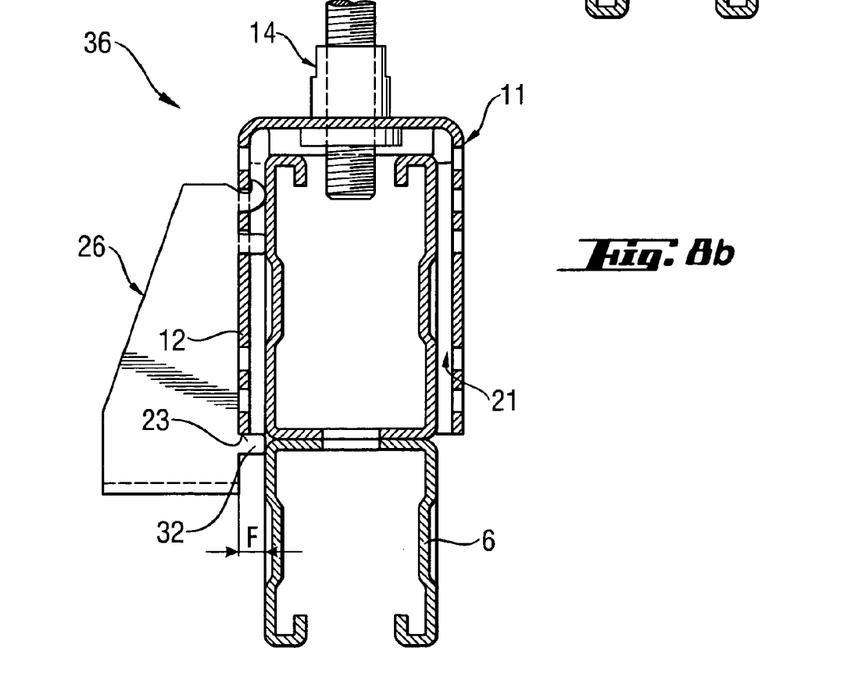
FIG. 8b a cross-sectional view showing the receiving member in its set-in condition.

FIGS. 8a and 8b show a process of assembling of a receiving member 26 with the intermediate member 11 for producing an inventive connection device which is mountable on a mounting rail 6 in two mounting stands. The intermediate member 11 is placed on a mounting rail 6 and is displaced therealong until it reaches a desired position for forming the connection device 36 on the mounting rail 6. The intermediate member 11 is secured to the mounting rail 6 with fastening means 17.

Then, the receiving member 26 is introduced with its setting-in elements 30 in the elementary receptacle 18 on the leg 12 of the intermediate member 11 and which corresponds to the desired height alignment of the mounting rails 3,4 or 7, 8 receivable in respective receiving members 26. By rotating the receiving member 26 in the direction of arrow 51, it is brought in abutment with a side wall of the mounting rail 6 or with the leg 12 of the intermediate member 11. This insures engagement of the engagement element 32 of the receiving member 26 in an elementary receptacle 18 adjacent to the elementary receptacle 18 in which the setting-in element 30 is received. The other, lower engagement element 32 is located beneath the free end 23 of the leg 12 of the intermediate member 11, as shown in FIG. 8b.

Now, the mounting rail 7, 8, which is to be connected with the mounting rail 6, can be introduced into the receiving member 26 and then be releasably connected with the connection device 36 by the securing element 41 which is introduced in a securing receptacle 19 in the leg 12 of the intermediate member 11 and which corresponds to a desired height position of the connectable mounting rail 7, 8.

Though the present invention was shown and described with references to the preferred embodiments, such are merely illustrative of the present invention and are not to be construed as a limitation thereof and various modifications of the present invention will be apparent to those skilled in the art. It is therefore, not intended that the present invention be limited to the disclosed embodiments or details thereof, and the present invention includes all variations and/or alternative embodiments within the spirit and scope of the present invention as defined by the appended claims.

What is claimed is:

1. A connection device for connecting mounting rails (2,3,4; 6,7 8) in a double-T joint, comprising:

an intermediate member (11) having two, extending substantially parallel to each other, legs (12) and a connection section (13) connecting the two legs (12) for at least partially encompassing a first one (2;6) of the mounting rails (2,3,4;6,7,8); and at least one receiving member (26) connectable with the intermediate member (11) and in which a second one (3,4;7,8) of the mounting rails (2,3,4;6,7,8), which butt-joins the first one (2;6) of the mounting rails (2,3,4;6,7,8), is received, the receiving member (26) having two, extending substantially parallel to each other legs (27) and a connection section (28) for connecting the two legs (27), wherein at least one of the legs (12) of the intermediate member (11) has a plurality of spaced from each other and located opposite each other, elementary receptacles (18), wherein the at least one receiving member (26) has a setting-in element (30) for selectively engaging in one of the elementary receptacles (18) for connecting the at least one receiving member (26) with the intermediate member (11), and wherein the connection device further comprises a securing element (41) including a setting-in section (42) for connecting the securing element (41) with the intermediate member (11) and fastening means (45) for securing the second one (3, 4; 7, 8) of the mounting rails (2, 3, 4; 6, 7, 8) with the connection device (1; 36), at least one of the legs (12) of the intermediate member (11) having a plurality of parallel, spaced from each other, slot-shaped securing receptacles (19) for selectively receiving the setting-in section (42) of the securing element (41) for securing the second one of the mounting rails (2, 3, 4; 6, 7, 8), which is received in the at least one receiving member (26), at a predetermined height with respect to the intermediate member (11).

2. A connection device according to claim 1, wherein setting-in element (30) is provided on each of the two legs (27) of the at least one receiving member (26), with the setting-in elements (30) of the two legs (27) being arranged opposite each other, the setting-in element (30) having a substantially hook-shaped profile for engaging the at least one leg (12) of the intermediate member (11) from behind.

3. A connection device according to claim 2, wherein a free end of the substantially hook-shaped setting-in element (30) extends at an angle to a plane defined by the connection section (28) of the receiving member (26).

4. A connection device according to claim 2, wherein the setting-in element (30) is provided on an edge (29) of the leg (27) of the receiving member (26) in a plane defined by the leg (27).

5. A connection device according to claim 1, wherein a plurality of engagement elements (32) are provided on the legs (27) of the at least one receiving member (26) for providing a locking connection between the at least one receiving member (26) and the intermediate member (11).

6. A connection device according to claim 5, wherein the engagement elements (32) are formed as pin-shaped elements and are provided on edges (29) of the legs (27) of the at least one receiving member (26).

7. A connection device according to claim 6, wherein the engagement elements (32) are provided in a plane defined by respective legs (27) of the at least one receiving member (26).

8. A connection device according to claim 1, wherein the securing element (41) has a bearing section (43) for supporting the securing element (41) on the second one (3,4; 7,8) of the mounting rails (2,3,4;6,7,8), and wherein setting-in section (42) has a hook-shaped profile.

9. A connection device according to claim 8, wherein the setting-in section (42) extends at an angle to a side of the bearing section (43) on which bearing means (47) of the fastening means (45) is supported.

10. A connection device according to claim 8, wherein the setting-in section (42) has a width (B) smaller than a width (A) of the bearing section (43).

11. A connection device according to claim 8, wherein the setting-in section (42) extends to a plane (E) defined by the bearing section (43) at an angle $\alpha$ from 0° to 250°.

12. A connection device according to claim 8, wherein the setting-in section (42) extends to a plane (E) defined by the bearing section (43) at an angle a from 5° to 15°.

13. A device according to claim 1, wherein the connection section (13) of the intermediate member (11) has a receptacle for receiving a tightening element.

14. A connection device according to claim 13 wherein the tightening element-receiving receptacle (14) has a threaded section (15).

15. A connection device according to claim 1, wherein in the legs (12) of the intermediate member (11) have adjacent spacing sections (22) for providing free space (21) for the setting-in element (30) of the at least one receiving member (26).

* * * * *